United States Patent [19]

Buswell et al.

[11] Patent Number: 5,484,577
[45] Date of Patent: Jan. 16, 1996

[54] CATALYTIC HYDROCARBON REFORMER WITH ENHANCED INTERNAL HEAT TRANSFER MECHANISM

[75] Inventors: Richard F. Buswell, Glastonbury, Conn.; Ronald Cohen, Boca Raton, Fla.; Joseph V. Clausi, Portland; Stanley L. Leavitt, North Canton, both of Conn.; David S. Watkins, Coquitlam, Canada

[73] Assignee: Ballard Power System Inc., North Vancouver, Canada

[21] Appl. No.: 250,371

[22] Filed: May 27, 1994

[51] Int. Cl.⁶ ........................................ B01J 8/06
[52] U.S. Cl. .......................... 422/211; 208/134; 422/148; 422/197
[58] Field of Search .................................... 422/148, 211, 422/213, 220, 221, 197, 190, 193, 196; 208/134

[56] References Cited

U.S. PATENT DOCUMENTS

| | | |
|---|---|---|
| 3,395,004 | 7/1968 | Taylor . |
| 3,469,944 | 9/1969 | Bocard et al. . |
| 3,475,126 | 10/1969 | Taylor . |
| 3,992,166 | 11/1976 | Okagami et al. . |
| 4,098,587 | 7/1978 | Krar et al. . |
| 4,098,588 | 7/1978 | Buswell et al. ........................ 48/94 |
| 4,098,589 | 7/1978 | Buswell et al. ........................ 48/94 |
| 4,203,950 | 5/1980 | Sederquist . |
| 4,585,708 | 4/1986 | Abens et al. . |
| 4,670,359 | 6/1987 | Beshty et al. . |
| 4,741,885 | 5/1988 | Herbort et al. ...................... 422/197 |
| 4,820,314 | 4/1989 | Cohen et al. . |
| 4,904,455 | 2/1990 | Karafian et al. . |
| 5,019,463 | 5/1991 | Matsubara et al. . |
| 5,068,159 | 11/1991 | Kinoshita . |
| 5,181,937 | 1/1993 | Karafian et al. . |

OTHER PUBLICATIONS

"Fuels And Reformer Technologies", Application And Marketing Assessment Of Fuel Cells In Canadian Electric Systems Workshop, Vancouver, B.C. Udengaard Apr. 1993.

Primary Examiner—Timothy M. McMahon
Attorney, Agent, or Firm—McAndrews, Held & Malloy, Ltd.

[57] ABSTRACT

A catalytic hydrocarbon reformer operates at lower temperature and pressure relative to conventional reformers. Convective heat transfer between the hot combustion gas stream and the reactor tube is enhanced through use of a narrow gap heat transfer area, which induces turbulent flow of the combustion gas stream across the reactor tube. The reactor tube includes a catalyst fines collection tube to accumulate and retain catalyst particles or fines entrained in the reformate gas stream.

4 Claims, 3 Drawing Sheets

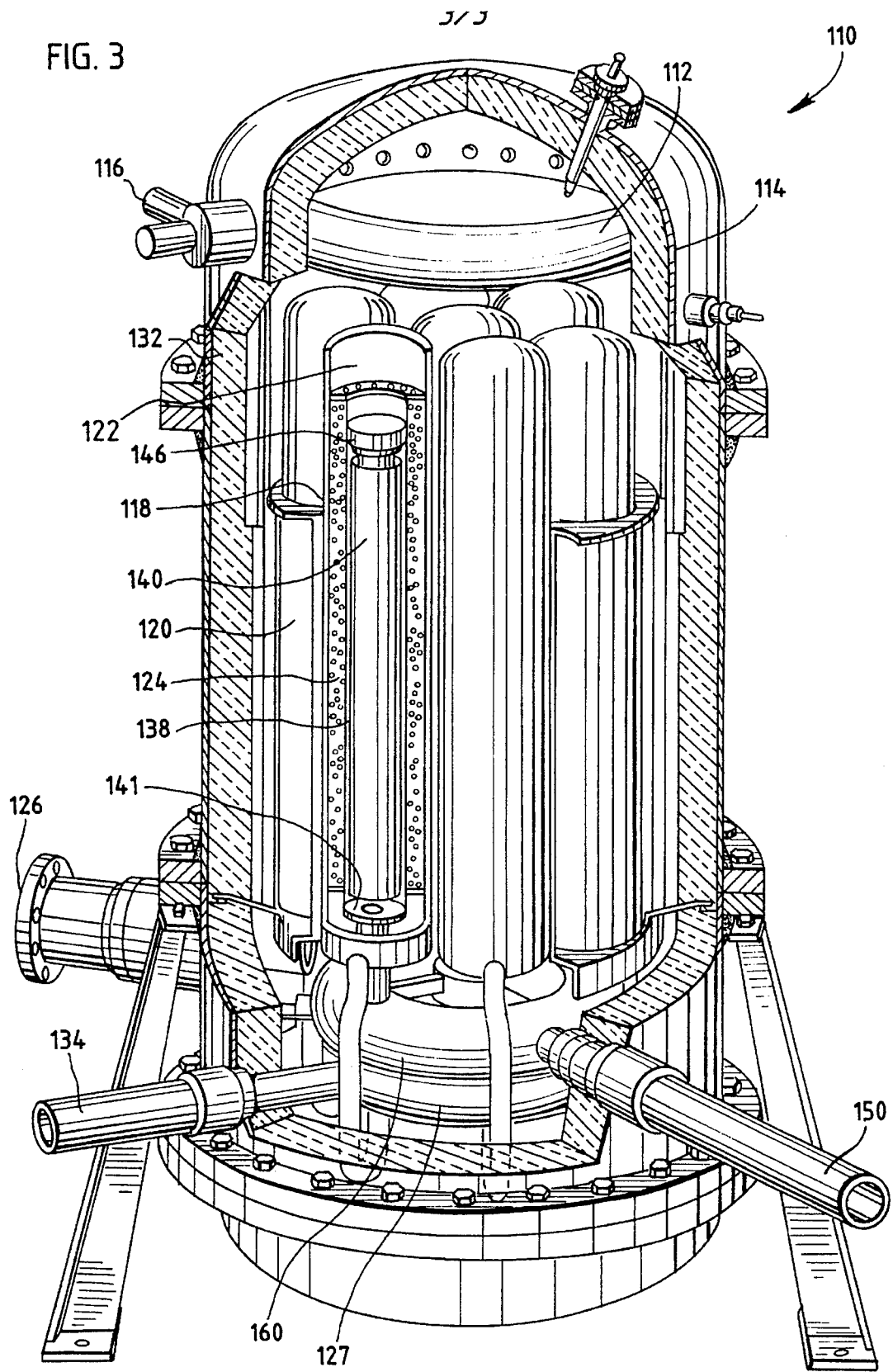

CATALYTIC HYDROCARBON REFORMER WITH ENHANCED INTERNAL HEAT TRANSFER MECHANISM

FIELD OF THE INVENTION

The present invention relates to chemical reactors. More particularly, the present invention relates to a chemical reactor for catalytically reforming or converting a hydrocarbon stream to a reformats stream including hydrogen. The catalytic reformer of the present invention incorporates an enhanced internal heat transfer mechanism between the chamber containing the burner combustion gases and the reaction chamber containing the catalyst pellets.

BACKGROUND OF THE INVENTION

A catalytic hydrocarbon fuel reformer converts a fuel stream, comprising, for example, natural gas, light distillates, methanol, propane, naphtha, kerosene, and/or combinations thereof, and water vapor into a hydrogen-rich reformats stream. The hydrogen-rich reformats stream is generally suitable for use as the fuel gas stream to the anode of an electrochemical fuel cell after passing through a water gas shift reactor and other purification means such as a carbon monoxide selective oxidizer. In the conversion process, the raw hydrocarbon fuel stream is typically percolated through a catalyst bed or beds contained within reactor tubes mounted in the reformer vessel. The catalytic conversion process is normally carried out at elevated catalyst temperatures in the range of about 1200° F. to about 1600° F. Such elevated temperatures are generated by the heat of combustion from a burner incorporated in the reformer.

The search for alternative power sources has focused attention on the use of electrochemical fuel cells to generate electrical power. Unlike conventional fossil fuel power sources, fuel cells are capable of generating electrical power from a fuel stream and an oxidant stream without producing substantial amounts of undesirable byproducts, such as sulfides, nitrogen oxide and carbon monoxide. However, the commercial viability of utility-based fuel cell systems depends in part on the ability to efficiently and cleanly convert conventional hydrocarbon fuels sources, such as natural gas (methane), to a hydrogen-rich reformate gas stream. Properly designed catalytic hydrocarbon reformers can generate the required reformate gas streams with increased reliability and decreased cost.

With respect to reliability and cost, conventional industrial catalytic hydrocarbon reformers have at least two major disadvantages with respect to fuel cell use. First, because conventional reformers operate at very high temperatures and pressure differentials, the reformer tubes which contain the catalyst must be constructed of rugged, thick walled portions of expensive materials capable of withstanding high temperature operating conditions. Additionally, conventional reformers also tend to be quite large, which again impacts material costs and the cost to provide and maintain the building space required to house large conventional reformers.

It is therefore an object of the present invention to provide a compact catalytic hydrocarbon reformer which operates at lower temperatures because of an enhanced heat transfer mechanism between the chamber containing the burner combustion gases and the reactor chamber.

It is also an object of the invention to reduce the overall volume of the catalytic hydrocarbon reformer assembly.

A further object of the invention is to provide a catalytic hydrocarbon reformer that minimizes the use of costly, high temperature materials for the components of the reformer.

Another object of the invention is to provide a catalytic hydrocarbon reformer with a lower differential pressure between the burner combustion gases and the process fuel reaction gases, thereby obviating the need to accommodate high internal pressure differentials.

A still further object of the invention is to provide a catalytic hydrocarbon reformer with reduced thermal gradients across the reformer components, thereby increasing the life expectancy of the reforming catalyst and internal components.

SUMMARY OF THE INVENTION

The above and other objects are achieved by a catalytic hydrocarbon reformer for converting raw hydrocarbon fuel and water vapor into a reformate gas stream comprising hydrogen. The reformer comprises:

(a) a substantially cylindrical closed vessel, the vessel having a top end and a bottom end, the vessel comprising at least one insulation layer adjacent the interior surface of its side wall;

(b) at least one substantially cylindrical reactor tube assembly disposed within the reformer vessel, the reactor tube assembly having an exterior surface, the reactor tube assembly comprising an outer annular catalyst chamber and a concentric inner gas return tube;

(c) a burner disposed within the reformer vessel, the burner capable of directing a combustion gas stream toward the bottom of the reactor vessel and toward the reactor tube assembly; and (d) an exhaust guide sleeve disposed between the reactor tube assembly and the at least one insulation layer, the exhaust guide sleeve being concentric with the reactor tube assembly;

wherein the radial distance between the reactor tube assembly and the exhaust guide sleeve is sufficiently small to disrupt laminar flow of the combustion gas stream along the exterior surface of the reactor tube assembly.

In the preferred catalytic hydrocarbon reformer, the reactor tube assembly further comprises a catalyst fines collection tube having a separator affixed toward the top thereof. The collection tube is concentrically disposed within the gas return tube such that a gas return annulus is formed between the annular catalyst chamber and the collection tube.

In the preferred catalytic hydrocarbon reformer, the at least one insulation layer comprises a plurality of insulation layers. Each of the insulation layers has a different conductive heat transfer coefficient.

The catalytic hydrocarbon reformer can comprise a plurality of reactor tube assemblies.

BRIEF DESCRIPTION OF THE DRAWINGS

FIG. 3 is a perspective view, partially in section, of an embodiment of the catalytic hydrocarbon reformer having a plurality of reactor tubes of the type illustrated in FIG. 1.

DETAILED DESCRIPTION OF THE PREFERRED EMBODIMENTS

Figure 1:
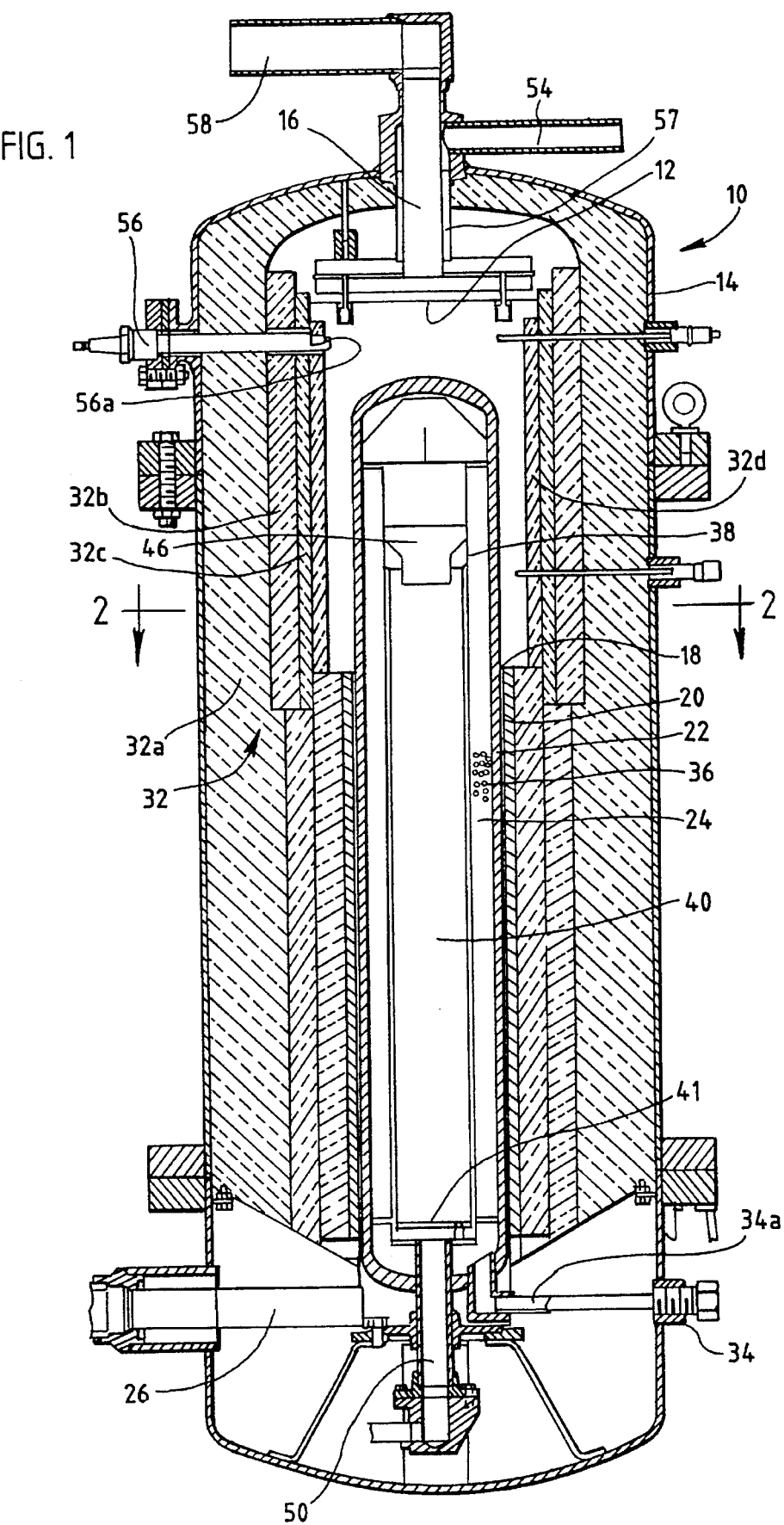
FIG. 1 is an axial sectional view of a catalytic hydrocarbon reformer.

Turning first to FIG. 1, a catalytic reformer 10 includes a burner 12 located at the top of reformer vessel 14. Burner 12 is supplied with a burner fuel gas stream through burner fuel gas inlet 57. The burner fuel gas stream is preferably composed of a recycled fuel cell stack exhaust gas stream directed to burner fuel gas inlet 57 via a recycled fuel gas inlet pipe 54 and a recycled air stream directed to burner gas inlet 16 via fresh fuel gas inlet pipe 58. The recycled exhaust fuel gas stream is the stream vented from the anode of the associated electrochemical fuel cell or cells arranged in a stack (not shown in FIG. 1). The recycled exhaust air stream is vented from the cathode of the associated electrochemical fuel cell or cells. The fuel gas stream is ignited at burner 12 by a spark generator 56a located at the end of an ignition mechanism or spark plug 56, as shown in FIG. 1.

The burner fuel gas stream is combusted at the burner 12 to create a hot combustion gas stream which flows turbulently toward the bottom of reactor vessel 14 through the narrow gap 18 between exhaust guide sleeve 20 and reactor tube 22. Gap 18 is formed sufficiently narrow (that is, the radial distance between exhaust guide sleeve 20 and the exterior surface of reactor tube 22 is sufficiently small) so that laminar flow of the combustion gas stream is disrupted and turbulent flow is induced. The reason for the disruption of laminar flow and the inducement of turbulent flow is to optimize the transfer of heat from the combustion gas stream to the exterior surface of the reactor tube 22 by minimizing or preventing the creation of a temperature gradient across the gap. In this regard, laminar flow of the combustion gas stream would result in the portion of the stream toward the center of the gap maintaining a higher temperature than the portion of the stream toward the exterior surface of the reactor tube 22.

The turbulent combustion gas stream from burner 12 preferably maintains the temperature of the catalyst chamber 24 in the range of about 1000° F. to about 1400° F. The pressure of the combustion gas stream is preferably maintained at about 63 psig. The combustion gas stream exiting narrow gap 18 is expelled from the interior of the reformer vessel 14 to the external piping via burner gas outlet 26.

As shown in FIG. 1, insulation assembly 32 is disposed on the inner surface of reformer vessel 14 to reduce heat loss from the interior of reaction vessel 14 to the external environment. Insulation assembly 32 preferably includes a plurality of insulation layers 32a, 32b, 32c, 32d, as shown in FIG. 1. Insulation layer 32a preferably comprises a soft wool type insulation material. Insulation layers 32b, 32c, 32d preferably comprise rigid insulation materials. Each of the insulation layers 32a, 32b, 32c, 32d has a different heat transfer coefficient matched to the temperature, pressure and spatial characteristics of the interior components, particularly the burner 12 and reactor tube 22, of reformer 10. Insulation layer 32a is preferably distributed within the upper and lower areas of vessel 14.

A hydrocarbon-containing reactant gas stream, which preferably comprises natural gas, steam, and, optionally, a small amount of recycled reformate, is fed via reactant gas inlet 34 and inlet 34a into the catalyst chamber 24 within reactor tube 22 at a pressure in the range of about 70–85 psig and a temperature of about 550° F. to about 700° F. The reactant gas stream is percolated through the catalyst pellets 36 contained in the catalyst chamber 24, where the reactant gas stream is converted into a hydrogen-rich reformate gas stream.

Upon exiting catalyst chamber 24 toward the top of reactor tube 22 in FIG. 1, the pressurized reformate gas stream is directed to a separator 46 and from there to the bottom of reactor tube 22 through return gap 38 formed between catalyst fines collection tube 40 and the interior wall of catalyst chamber 24. Catalyst particles or fines entrained in the reformate stream are prevented from exiting the reactor tube 22 by a separator 46, and are accumulated in catalyst fines collection tube 40. In operation, the entrained catalyst fines in the pressurized reformate gas stream separate from the reformate stream due to the low velocity of the stream as it changes directions from first being directed downwardly through separator 46 and then being directed upwardly to return gap 38. The catalyst fines fall from separator 46 to the bottom of collection tube 40 onto a catalyst fines collection screen 141 located at the bottom of collection tube 40, where the fines accumulate and remain for the service life of the reformer 10.

The reformate gas stream exits the reformer vessel 14 via reformate gas stream outlet 50 and is eventually introduced to the anode of the associated electrochemical fuel cell(s).

Figure 2:
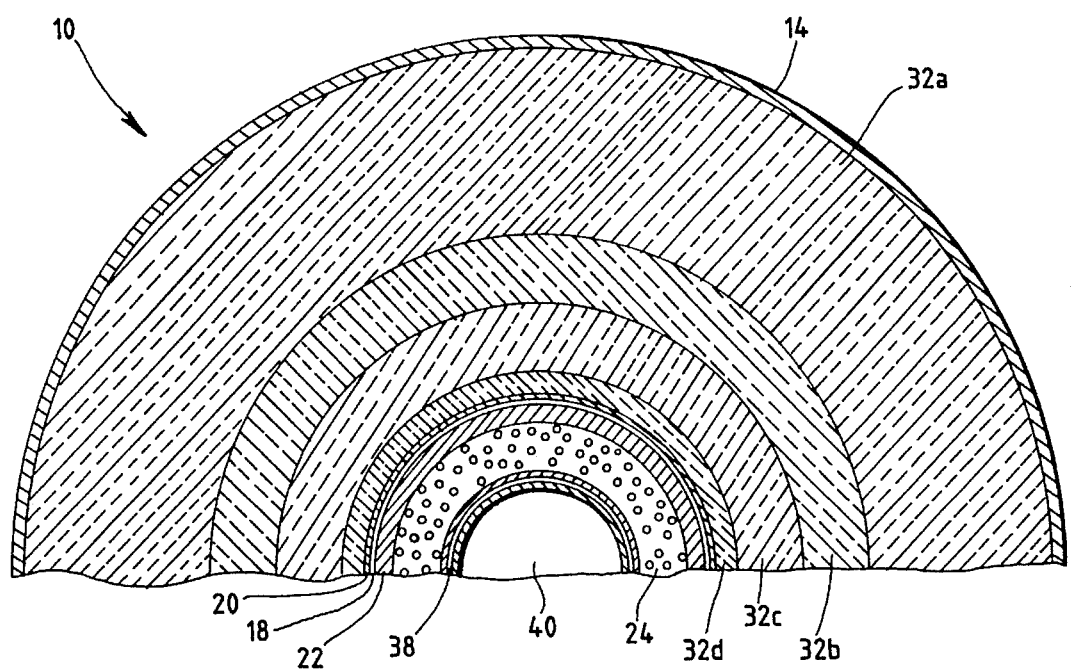
FIG. 2 is a top cross sectional view of one-half of the reformer, taken in the direction of arrows A—A in FIG. 1.

Turning now to FIG. 2, a top sectional view of reformer 10 is shown, taken in the direction of arrows A—A in FIG. 1. FIG. 2 shows the relative position within reformer 10 of vessel 14, narrow gap 18, exhaust guide sleeve 20, reactor tube 22, catalyst chamber 24, insulation layers 32a, 32b, 32c, 32d, return gap 38, and catalyst fines collection tube 40.

FIG. 3 shows a catalytic hydrocarbon reformer 110 having a plurality of reactor tubes of the type illustrated and described as reactor tube 22 in FIG. 1. In the embodiment shown in FIG. 3, the process of converting a raw hydrocarbon reactant stream to a hydrogen-rich reformate stream is carried out in a plurality of reactor tubes, one of which is designated in FIG. 3 as reactor tube 122. Reactor tube 122 is substantially identical to reactor tube 22 in FIG. 1.

In the embodiment of FIG. 3, heat to promote the conversion of the hydrocarbon reactant stream to the reformate stream is supplied by toroidal burner 112 located at the top of reformer vessel 114. Burner 112 is supplied with a burner fuel gas stream through burner fuel gas inlet 116. As in reformer 10 in FIG. 1, the burner fuel gas stream of reformer 110 of FIG. 3 is preferably composed of a recycled exhaust fuel gas stream. The recycled exhaust fuel gas stream is the stream vented from the anode of the associated electrochemical fuel cell or cells (not shown in FIG. 3).

The burner fuel gas stream is combusted at the burner 112 to create a hot combustion gas stream which flows turbulently through the narrow gap 118 between exhaust guide sleeve 120 and reactor tubes 122. Gap 118 is formed sufficiently narrow (that is, the radial distance between exhaust guide sleeve 120 and the exterior surfaces of reactor tubes 122 is sufficiently small) so that laminar flow of the combustion gas stream is disrupted and inhibited and turbulent flow is effected. The combustion gas stream exiting narrow gap 118 is expelled from the interior of the reformer vessel 114 to the external piping via burner gas outlet 126.

As shown in FIG. 3, insulation assembly 132 is disposed on the inner surface of reformer vessel 114 to reduce heat loss from the interior of reaction vessel 114 to the external environment. Insulation assembly 132 preferably includes a plurality of insulation layers (not shown in FIG. 3). Each of the insulation layers preferably has a different heat transfer coefficient matched to the temperature, pressure and spatial characteristics of the interior components, particularly the burner 112 and reactor tube 122, of reformer 110.

A hydrocarbon-containing reactant gas stream, which preferably comprises natural gas, steam and, optionally, a small amount of recycled reformate, enters feed gas toroid 127 through a feed gas inlet 134. The reactant gas stream flows from feed gas toroid 127 into catalyst chambers, one of which is designated in FIG. 3 as catalyst chamber 124, within reactor tubes 122 at a pressure in the range of about 70–85 psig and a temperature of about 550° F. to about 700° F. The reactant gas stream is percolated through catalyst pellets in catalyst chamber 124, where the reactant gas stream is converted into a hydrogen-rich reformate gas stream.

Upon exiting catalyst chamber 124 toward the top of reactor tube 122 in FIG. 3, the pressurized reformate gas stream is directed to the bottom of reactor tube 122 through return gap 138 formed between catalyst fines collection tube 140 and the interior wall of catalyst chamber 124. Catalyst particles or fines entrained in the reformate stream are prevented from exiting the reactor tube 122 by separator 146 and are accumulated in catalyst fines collection tube 140. In operation, the entrained catalyst fines entrained in the pressurized reformate gas stream fall through catalyst separator 146 into catalyst fines collection tube 140 onto a catalyst fines collection screen 141 located at the bottom of collection tube 140, where they accumulate and remain for the service life of the reformer 110.

The reformate gas stream is directed from gap 138 to an outlet toroid 160 and exits the reformer vessel 114 via reformate gas stream outlet 150 and is eventually introduced to the anode of the associated electrochemical fuel cell(s).

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A catalytic hydrocarbon reformer for converting raw hydrocarbon fuel into a reformate gas stream comprising hydrogen, said reformer comprising:

(a) a substantially cylindrical closed vessel, said vessel having a top end and a bottom end, said vessel comprising at least one insulation layer adjacent the interior surface of its side wall;

(b) at least one substantially cylindrical reactor tube disposed within said reformer vessel, said reactor tube comprising an outer annular catalyst chamber defined by the volume between said exterior surface and a concentric inner gas return tube;

(c) a burner disposed within said reformer vessel, said burner capable of generating and directing a combustion gas stream toward the bottom of said reactor vessel and toward said reactor tube assembly;

(d) an exhaust guide sleeve disposed between said reactor tube and said at least one insulation layer, said exhaust guide sleeve being concentric with said reactor tube; and (e) a catalyst fines collection tube having a separator affixed at or near the top thereof, said collection tube concentrically disposed within said gas return tube such that a gas return annulus is formed between said annular catalyst chamber and said collection tube;

wherein the radial distance between said reactor tube and said exhaust guide sleeve is sufficiently small to cause flow of said combustion gas stream along the exterior surface of the reactor tube assembly to be turbulent.

2. The catalytic hydrocarbon reformer of claim 1 wherein said at least one insulation layer comprises a plurality of insulation layers, each of said insulation layers having a different heat transfer coefficient.

3. The catalytic hydrocarbon reformer of claim 1 wherein said at least one reactor tube comprises a plurality of reactor tubes.

4. A catalytic hydrocarbon reformer for converting raw hydrocarbon fuel into a reformat gas stream comprising hydrogen, said reformer comprising:

(a) a substantially cylindrical closed vessel, said vessel having a top end and a bottom end, said vessel optimizing at least one insulation layer adjacent the interior surface of its side wall;

(b) at least one substantially cylindrical reactor tube disposed within said reformer vessel, said reactor tube comprising an outer annular catalyst chamber defined by the volume between said exterior surface and a concentric inner gas return tube;

(c) a burner disposed within said reformer vessel, said burner capable of generating and directing a combustion gas stream toward the bottom of said reactor vessel and toward said reactor tube assembly;

(d) an exhaust guide sleeve disposed between said reactor tube and said at least one insulation layer, said exhaust guide sleeve being concentric with said reactor tube; and (e) a catalyst fines collection tube having a separator affixed at or near the top thereof, said collection tube concentrically disposed within said gas return tube such that a gas return annulus is formed between said annular catalyst chamber and said collection tube.

\* \* \* \* \*

UNITED STATES PATENT AND TRADEMARK OFFICE
CERTIFICATE OF CORRECTION

PATENT NO. : 5,484,577
DATED : January 16, 1996
INVENTOR(S): Buswell et al.

It is certified that error appears in the above-identified patent and that said Letters Patent is hereby corrected as shown below:

Col. 1, line 10, "reformats" should read
--reformate--.

Col. 1, lines 20-21, "reformats" should read
--reformate--.

Col. 1, line 21, "reformats" should read
--reformate--.

Col. 6, lines 28-29, "optimizing" should read
--comprising--.

Signed and Sealed this

Eighteenth Day of June, 1996

Attest:

BRUCE LEHMAN

Attesting Officer        Commissioner of Patents and Trademarks